(12) United States Patent
Shin et al.

(10) Patent No.: US 10,148,215 B2
(45) Date of Patent: Dec. 4, 2018

(54) SYSTEM OF CALCULATING TEMPERATURE USING THERMAL EQUIVALENT CIRCUIT

(71) Applicants: Hyundai Motor Company, Seoul (KR); Kia Motors Corporation, Seoul (KR)

(72) Inventors: YoungJin Shin, Gyeongsangnam-do (KR); Sanghoon Moon, Gyeonggi-do (KR); WoongChan Chae, Gyeonggi-do (KR); Hyoungjun Cho, Gyeonggi-do (KR); Jung Shik Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/783,120

(22) Filed: Oct. 13, 2017

(65) Prior Publication Data

US 2018/0109221 A1   Apr. 19, 2018

(30) Foreign Application Priority Data

Oct. 17, 2016   (KR) .......................... 10-2016-0134608

(51) Int. Cl.
*G05D 23/00* (2006.01)
*H02P 29/60* (2016.01)
(Continued)

(52) U.S. Cl.
CPC .............. *H02P 29/60* (2016.02); *G01K 1/024* (2013.01); *G01K 7/427* (2013.01); *G01K 13/00* (2013.01);
(Continued)

(58) Field of Classification Search
CPC ...... H02P 1/00; H02P 3/00; H02P 6/00; H02P 6/12; H02P 1/04; H02P 7/08; H02P 23/12; G05D 23/275; G05D 23/00; G05B 5/00
(Continued)

(56) References Cited

U.S. PATENT DOCUMENTS 9,593,986 B2* 3/2017 Ito ........................... G01K 7/427
2016/0344268 A1* 11/2016 Tsukamoto ............ H02K 11/25

FOREIGN PATENT DOCUMENTS

| JP | 2009-011054 A | 1/2009 |
|---|---|---|
| KR | 10-2006-0008373 | 1/2006 |
| KR | 10-1394548 B1 | 5/2014 |

OTHER PUBLICATIONS

Park, Chan-Bae, et al., "Investigation on Thermal Analysis Methos of IPMSM for Railway Vehicles", Jrl of the Korean Society for Railway, vol. 16, Issue 2, 2013, pp. 99-103.

* cited by examiner

*Primary Examiner* — Antony M Paul
(74) *Attorney, Agent, or Firm* — Mintz Levin Cohn Ferris Glovsky and Popeo, P.C.; Peter F. Corless

(57) ABSTRACT

A system of calculating temperature may include: a motor including a housing having opened ends, a cover connected to the housing to close at least one of the opened ends, a shaft rotatably disposed in the housing and having one end which penetrates through a center portion of the cover, a rotor fixed on an exterior circumference of the shaft in the housing and the cover, a stator fixed on an interior circumference of the housing, and an air gap formed between an exterior circumference of the rotor and an interior circumference of the stator; an input portion receiving a real time input and a predetermined input; and a control portion establishing a thermal equivalent circuit using the inputs of (Continued)

the input portion and convection or conduction characteristics between constituent elements of the motor, and calculating a temperature of each constituent element using the thermal equivalent circuit.

10 Claims, 6 Drawing Sheets

(51) Int. Cl.
    *H02K 5/04*         (2006.01)
    *G01K 13/00*       (2006.01)
    *G01K 1/02*         (2006.01)
    *H02P 29/66*       (2016.01)
    *G01K 7/42*         (2006.01)
    *G01K 13/08*       (2006.01)

(52) U.S. Cl.
    CPC ............... *G01K 13/08* (2013.01); *H02K 5/04* (2013.01); *H02P 29/662* (2016.11); *G01K 2205/00* (2013.01); *G01K 2217/00* (2013.01)

(58) Field of Classification Search
    USPC .......... 318/634, 641, 400.08, 788, 792, 471,
                    318/472; 324/431, 441, 224, 750.06,
                    324/750.03, 750.28, 670, 685, 721;
              310/315, 346, 49.06, 49.07, 68 C, 175;
              165/903; 219/681, 400, 449.1; 374/135;
                  361/25, 26, 27, 220, 679.54, 704
    See application file for complete search history.

FIG. 5

| Classification | Thermal system | Electric system |
|---|---|---|
| Potential | $\Delta T$ | V |
| Flow | Q' | I |
| Resistance | R | R |
| Capacitance | C | C |
| Law | $Q' = \Delta T/R$ | $I = V/R$ |

SYSTEM OF CALCULATING TEMPERATURE USING THERMAL EQUIVALENT CIRCUIT

CROSS-REFERENCE TO RELATED APPLICATION

This application claims under 35 U.S.C. § 119(a) the benefit of Korean Patent Application No. 10-2016-0134608 filed in the Korean Intellectual Property Office on Oct. 17, 2016, the entire contents of which are incorporated herein by reference.

BACKGROUND

(a) Technical Field

The present disclosure relates to a system of calculating a temperature using a thermal equivalent circuit which calculates a temperature of each constituent element of a drive motor according to a driving condition of the drive motor used in a vehicle, and protects the drive motor according to the temperature of each constituent element.

(b) Description of the Related Art

A drive motor used in a vehicle may be one of various types of motors. The drive motor functions as a motor and a generator. One type of drive motor is an interior permanent magnet synchronous motor (IPMSM). It is known to employ the IPMSM as a drive motor.

Since the IPMSM has a magnetic torque component due to current of a permanent magnet and an armature and reluctance torque component due to a difference between d-axis inductance and q-axis inductance, the IPMSM can obtain high torque per unit volume.

However, excessive iron loss occurs at a high-speed region due to driving characteristics of the IPMSM, and copper loss occurs because a large amount of input current is necessary due to high power control. Therefore, a heat source is generated, and a temperature of the IPMSM is raised by generation of the heat source. Thereby, lifespan of the IPMSM and characteristics of a permanent magnet made of rare earth materials having demagnetization characteristics at a high temperature may be deteriorated.

When designing a motor, it is necessary to consider temperature characteristics of the motor.

To this end, various methods of analyzing heat of the motor are proposed such as a thermal equivalent circuit method using a lumped parameter method, and a distributed parameter method using a finite element method and a finite difference method.

Among these, a finite element method and a finite difference method are mainly used to calculate thermal performance of the motor.

According to the finite element method and the finite difference method, it requires much time to divide a region into a plurality of elements and calculate a matrix.

That is, it is difficult to apply the finite element method and the finite difference method to an entire region of the motor.

Therefore, it is necessary to develop a method that can be applied to more easily analyze heat of the motor than a distributed parameter method and can easily calculate a temperature distribution in an entire region of the motor.

The above information disclosed in this Background section is only for enhancement of understanding of the background of the disclosure and therefore it may contain information that does not form the prior art that is already known in this country to a person of ordinary skill in the art.

SUMMARY

The present disclosure provides a system of calculating temperature having advantages of shortening thermal analysis time compared to a conventional thermal analysis method and calculating a temperature of each constituent element of a motor by using thermal equivalent circuits of optimal constituent elements considering convection and conduction characteristics of the constituent elements.

A system of calculating temperature according to an exemplary embodiment of the present disclosure may include: a motor including a housing having opened ends, a cover connected to the housing to close at least one of the opened ends of the housing, a shaft rotatably disposed in the housing and having one end which penetrates through a center portion of the cover, a rotor fixed on an exterior circumference of the shaft in the housing and the cover, a stator fixed on an interior circumference of the housing, and an air gap formed between an exterior circumference of the rotor and an interior circumference of the stator; an input portion receiving a real time input and a predetermined input; and a control portion establishing a thermal equivalent circuit using the inputs of the input portion and convection or conduction characteristics between constituent elements of the motor, and calculating a temperature of each constituent element using the thermal equivalent circuit, wherein the control portion establishes the thermal equivalent circuit including convection or conduction characteristics between any two of the housing, the cover, the shaft, the rotor, the stator, the air gap between the rotor and the stator, an interior air existing in the housing, and an exterior air existing at an outer of the cover and the housing, and calculates the temperature of each constituent element of the motor based on a heat generation amount generated according to a driving condition of the motor driving condition.

The shaft may include: a first shaft contact portion contacting the rotor; a first shaft exposed portion exposed to the interior air existing in the cover; a second shaft contact portion contacting the cover; and a second shaft exposed portion exposed to the exterior air, wherein the control portion establishes a thermal conduction equivalent circuit between the shaft contact portion and the rotor, establishes a thermal convection equivalent circuit between the first shaft exposed portion and the interior air, establishes a thermal conduction equivalent circuit between the shaft contact portion and the cover, and establishes a thermal convection equivalent circuit between the second shaft exposed portion and the exterior air.

The control portion may establish a thermal convection equivalent circuit between the exterior circumference of the rotor and the air gap, establish a thermal convection equivalent circuit between a side surface of the rotor and the interior air, establish a thermal convection equivalent circuit between the interior circumference of the stator and the air gap, and establish a thermal convection equivalent circuit between a side surface of the stator and the interior air.

The housing may include: a housing exposed portion exposed to the interior air; and a housing contact portion with stator contacting the exterior circumference of the stator, wherein the control portion establishes a thermal convection equivalent circuit between the housing exposed portion and the interior air, and establishes a thermal conduction equivalent circuit between the housing contact portion with stator and the exterior circumference of the stator.

The cover may include: a first cover contact portion contacting an end portion of the housing; a cover exposed portion exposed to the interior air; and a second cover contact portion contacting the shaft, wherein the control portion establishes a thermal conduction equivalent circuit between the first cover contact portion and the housing, establishes a thermal convection equivalent circuit between the cover exposed portion and the interior air, and establishes a thermal conduction equivalent circuit between the second cover contact portion and the shaft.

The motor may further include a bearing disposed between the cover and the shaft, wherein the control portion establishes a thermal conduction equivalent circuit between the bearing and the cover, and establishes a thermal conduction equivalent circuit between the bearing and the shaft.

The real time input may include an input power, a torque, an ambient temperature, and a rotation speed as the driving condition, and the predetermined input may include shape, material, physical characteristics, and convection or conduction characteristics of each constituent element of the motor.

The control portion may calculate a temperature of a heat generating portion using the input power and a predetermined efficiency of the motor, and calculate the temperature of each constituent elements using the temperature of the heat generating portion and the thermal equivalent circuit between any two constituent elements.

The heat generating portion may include a coil of the stator, a core of the stator, a core of the rotor, a bearing, a friction element, and a magnet of the rotor.

The control portion may compare the calculated temperature of each constituent element with a predetermined value for each constituent elements, and lower the input power or generate a warning signal if the temperature of any one constituent element is higher than the predetermined value for the one constituent element.

According to an exemplary embodiment of the present disclosure, a method of calculating a temperature may be provided which establishes thermal equivalent circuits of constituent elements depending on conduction/convection characteristics and an input power and calculates a temperature of each constituent element using the thermal equivalent circuits when analyzing thermal characteristics of electronic devices such as motors. Therefore, a temperature of a motor may be calculated in a relatively short time.

That is, calculation time is shortened by analyzing a heat system of a motor in a similar way of an electric system, thermal breakage of the motor may be prevented in advance by calculating a temperature of each constituent element in real time, and durability may be improved.

In addition, a temperature of the motor may be precisely calculated by establishing a thermal equivalent circuit of the motor using optimal constituent elements considering convection or conduction characteristics according to an exemplary embodiment of the present disclosure.

BRIEF DESCRIPTION OF THE DRAWINGS

FIG. 5 is a table where a thermal system according to an exemplary embodiment of the present disclosure is compared with an electric system.

DETAILED DESCRIPTION OF THE EMBODIMENTS

Figure 1:
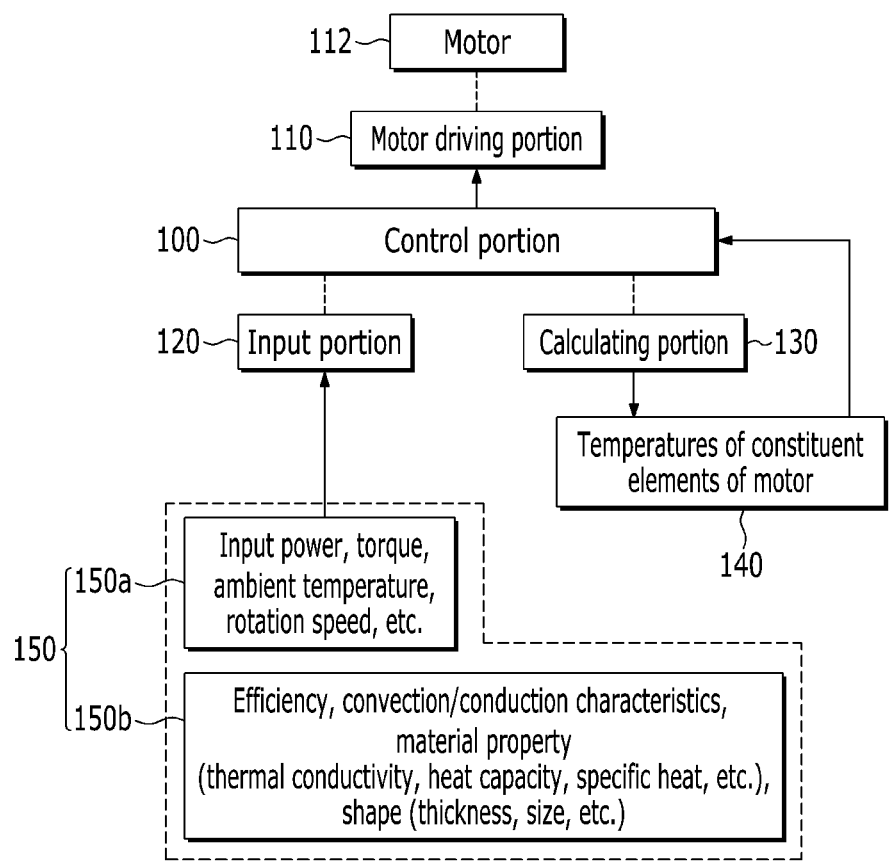
FIG. 1 is a schematic diagram of a system of calculating a temperature of a motor using a thermal equivalent circuit according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

An exemplary embodiment of the present disclosure will hereinafter be described in detail with reference to the accompanying drawings.

Since size and thickness of each component illustrated in the drawings are arbitrarily represented for ease of explanation, the present disclosure is not limited to the drawings. Thicknesses of many parts and regions are enlarged.

Description of components that are not necessary for explaining the present exemplary embodiment will be omitted, and the same constituent elements are denoted by the same reference numerals in this specification.

FIG. 1 is a schematic diagram of a system of calculating a temperature of a motor using a thermal equivalent circuit according to an exemplary embodiment of the present disclosure.

Referring to FIG. 1, a system of calculating temperature of a motor includes a motor 112, a motor driving portion 110, a control portion 100, an input portion 120, and a calculating portion 130. An input value 150 input into the input portion 120 includes a real time input 150a and a predetermined input 150b. In addition, temperatures 140 calculated by the calculating portion 130 includes the temperature of each of the constituent elements of the motor.

The real time input 150a includes an input power, a torque, an ambient temperature, and a rotation speed, and the predetermined input 150b includes efficiency, convection or conduction characteristics, material properties such as thermal conductivity, heat capacity, specific heat, etc., and shape including thickness and size.

The control portion 100 calculates a temperature of a heat generating portion using the input value 150, calculates temperatures of constituent elements using the temperature of the heat generating portion and a thermal convection equivalent circuit or a thermal conduction equivalent circuit between the heat generating portion and any one of the constituent elements or between any two of the constituent elements, and controls the motor driving portion 110 to control the input power input into the motor 112 or the rotation speed if the calculated temperature exceeds a predetermined value. It is illustrated in FIG. 1 but is not limited that the control portion 100 is a separate element from the calculating portion 130. The control portion 100 may include the calculating portion 130. Hereinafter, it is to be understood that the control portion 100 includes the control portion 100 itself and the calculating portion 130.

In addition, if the calculated temperature exceeds the predetermined value, the control portion 100 generates an overheating signal. In addition, the system of calculating the temperature of the motor may include a displaying portion (not shown) through which a user can check an overheating state of the motor 112, and the control portion 100 can control operation of the displaying portion based on the overheating signal. For example, the control portion 100 compares a temperature of any one of the constituent elements with a predetermined value for a respective one of the constituent elements, and may lower the input power if the temperature of the respective one of the constituent elements is higher than the predetermined value for the respective one of the constituent elements.

The control portion 100 may be implemented by at least one processor operated by a predetermined program and the predetermined program may be programmed to perform each step of a method according to an exemplary embodiment of the present disclosure.

Figure 2:
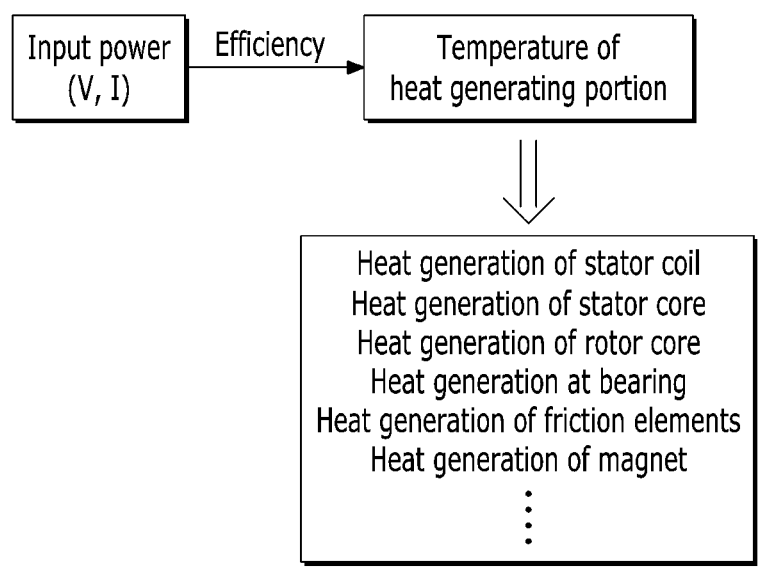
FIG. 2 is a schematic diagram illustrating elements of a heat generating portion depending on an input power and efficiency according to an exemplary embodiment of the present disclosure.

FIG. 2 is a schematic diagram illustrating elements of a heat generating portion depending on an input power and efficiency according to an exemplary embodiment of the present disclosure.

Referring to FIG. 2, the input power is input to the control portion 100 in real time, and the temperature of the heat generating portion is calculated according to the input power and the efficiency of the motor 112. Since a method of calculating the temperature of the heat generating portion is well known to a person of ordinary skill in the art, detailed description thereof will be omitted. In addition, the temperature of the heat generating portion according to the input power and the efficiency of the motor 112 may be predetermined in a map. The heat generating portion may include, but is not limited to, a coil of the stator, a core of the stator, a core of the rotor, bearings, friction elements, and/or a magnet of the rotor.

In addition, according to the exemplary embodiment of the present disclosure, the rotation speed of the motor 112 as well as the input power is input to the control portion 100, and the temperature of the friction element and the temperature of the bearing may be calculated according to the rotation speed of the motor. The temperature of the friction element and the temperature of the bearing according to the rotation speed of the motor may be predetermined in a map.

Figure 3:
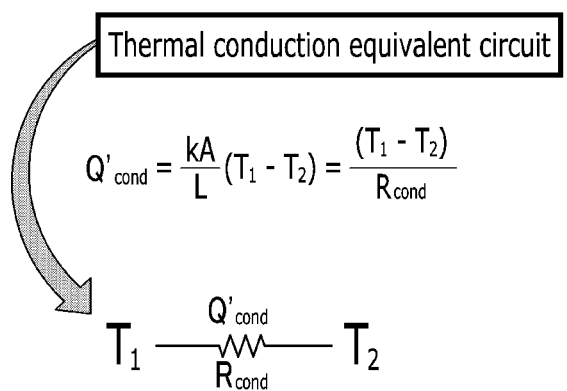
FIG. 3 schematically depicts a thermal conduction equivalent circuit based on a thermal conduction equation according to an exemplary embodiment of the present disclosure.

FIG. 3 schematically depicts a thermal conduction equivalent circuit based on a thermal conduction equation according to an exemplary embodiment of the present disclosure.

Referring to FIG. 3, a thermal conduction equivalent circuit may be represented by a temperature difference (T1−T2) between two elements, a thermal resistance Rcond, and thermal conductivity Q'cond.

Therefore, if the thermal resistance, the thermal conductivity, and a temperature T1 of one of two elements are input, a temperature T2 of the other of the two elements can be calculated. On the contrary, if the thermal resistance, the thermal conductivity, and T2 are input, T1 can be calculated.

Figure 4:
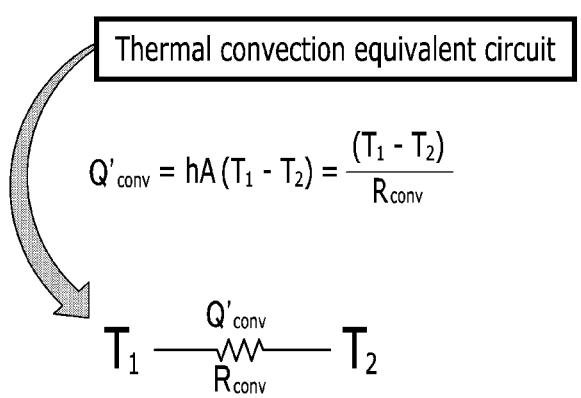
FIG. 4 schematically depicts a thermal convection equivalent circuit based on a thermal convection equation according to an exemplary embodiment of the present disclosure.

FIG. 4 schematically depicts a thermal convection equivalent circuit based on a thermal convection equation according to an exemplary embodiment of the present disclosure.

Referring to FIG. 4, a thermal convection equivalent circuit may be represented by a temperature difference (T1−T2) between two elements, a thermal resistance Rcond, and a convection coefficient Q'conv.

Therefore, if the thermal resistance, the convection coefficient, and a temperature T1 of one of two elements are input, a temperature T2 of the other of the two elements can be calculated. On the contrary, if the thermal resistance, the convection coefficient, and T2 are input, T1 can be calculated.

FIG. 5 is a table where a thermal system according to an exemplary embodiment of the present disclosure is compared with an electric system.

Referring to FIG. 5, an equation governing a thermal system is established by a temperature difference ΔT, the thermal conductivity (convection coefficient) Q', the thermal resistance R, and the heat capacity C, and an equation governing an electric system is established by a voltage V, a current I, a resistance R, and a capacity C.

Calculation time is shortened by analyzing a heat system of a motor 112 in a similar way of an electric system, thermal breakage of the motor 112 may be prevented in advance by calculating a temperature of each constituent element in real time, and durability may be improved according to an exemplary embodiment of the present disclosure.

Figure 6:
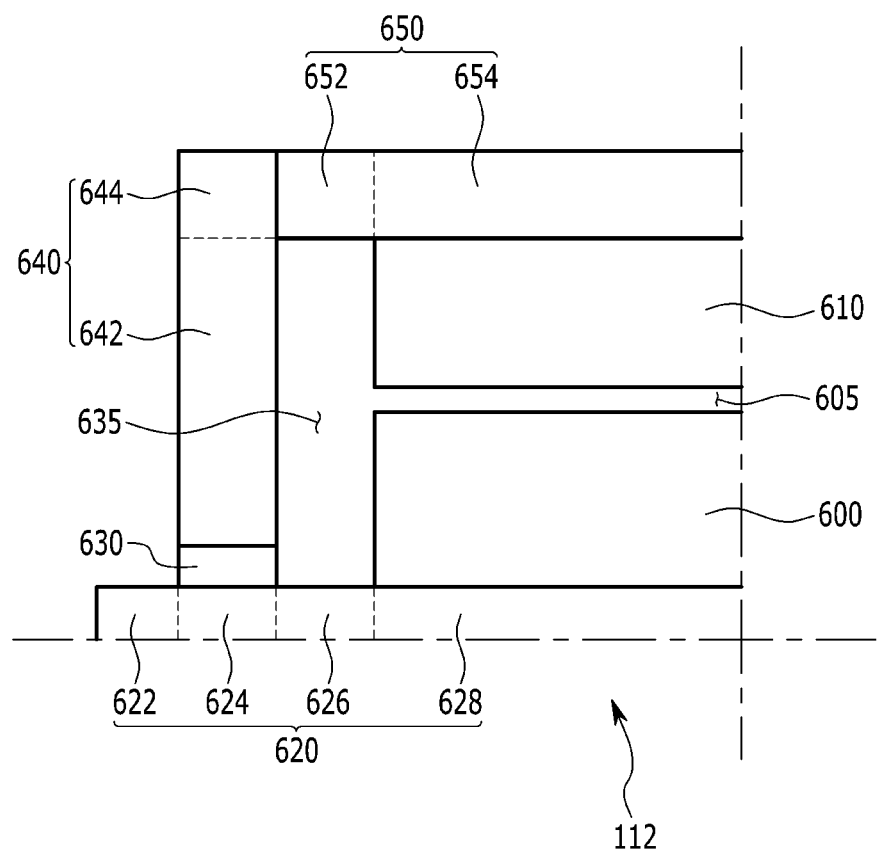
FIG. 6 is a schematic diagram of constituent elements of a motor according to an exemplary embodiment of the present disclosure.

FIG. 6 is a schematic diagram of constituent elements of a motor according to an exemplary embodiment of the present disclosure.

Referring to FIG. 6, the motor 112 includes a housing 650, a cover 640, a stator 610, a rotor 600, and a shaft 620. In addition, an air gap 605 is formed between the stator 610 and the rotor 600, an interior air exists in the cover 640, and an exterior air exists at an outer of the housing 650 and the cover 640.

The stator is fixed on an interior circumference of the housing 650 and both ends of the housing 650 are open.

The cover 640 is connected to the housing 650 to close the opened both ends of the housing 650.

The shaft 620 is rotatably disposed in the housing 650 and at least one end of the shaft 620 penetrates through a center portion of the cover 640 and is protruded out from the housing 650.

The rotor 600 is fixed on an exterior circumference of the shaft 620 in the housing 650 and the cover 640.

The stator 610 is disposed apart from an exterior circumference of the rotor 600 with the air gap 605 being formed between the stator 610 and the rotor 600 and is fixed on an interior circumference of the housing 650.

The housing 650 includes a housing contact portion with stator 654 and a housing exposed portion (to interior air) 652. Since the air gap 605 is formed between the stator 610 and the rotor 600, thermal convection occurs between the stator 610 and the rotor 600 and the air gap 605, respectively.

In addition, thermal convection occurs between sides of the rotor 600 and the stator 610 and the interior air, respectively. Thermal conduction occurs between the stator 610 and the housing contact portion with stator 654.

The cover 640 includes a first cover contact portion (with housing) 644 and a cover exposed portion (to interior air) 642, and the shaft 620 includes a second shaft exposed portion (to exterior air) 622, a shaft bearing contact portion 624, a first shaft exposed portion (to interior air) 626, and a first shaft contact portion (with rotor) 628.

Thermal conduction occurs between the first cover contact portion 644 and the housing exposed portion 652, thermal convection occurs between the cover exposed portion 642 and the interior air 635 and between the cover exposed portion 642 and the exterior air, and thermal conduction occurs between the bearing 630 and the cover exposed portion 642 and between the bearing 630 and the shaft bearing contact portion 624.

Thermal convection occurs between the second shaft exposed portion 622 and the exterior air, thermal conduction occurs between the shaft bearing contact portion 624 and the bearing 630, thermal convection occurs between the first shaft exposed portion 626 and the interior air, and thermal conduction occurs between the first shaft contact portion 628 and the rotor 600.

As described above, if the constituent elements of the motor are classified into detail regions according to types of heat transfer, a thermal equivalent circuit is established between the detail regions.

According to the exemplary embodiment of the present disclosure, a thermal conduction equivalent circuit is established between the housing contact portion with stator 654 and the stator 610, a thermal convection equivalent circuit is established between the housing exposed portion 652 and the interior air 635, a thermal convection equivalent circuit is established between the stator 610 and the air gap 605, and a thermal convection equivalent circuit is established between the rotor 600 and the air gap 605.

In addition, thermal convection equivalent circuits are established between the side surface of the stator 610 and the interior air and between the side surface of the rotor 600 and the interior air.

In addition, a thermal conduction equivalent circuit is established between the rotor 600 and the first shaft contact portion 628, and a thermal convection equivalent circuit is established between the first shaft exposed portion 626 and the interior air.

A thermal conduction equivalent circuit is established between the bearing 630 and the shaft bearing contact portion 624, a thermal conduction equivalent circuit is established between the bearing 630 and the cover exposed portion 642, and a thermal conduction equivalent circuit is established between the cover exposed portion 642 and the first cover contact portion 644.

If the exemplary embodiment of the present disclosure does not includes the bearing 630, the shaft bearing contact portion 624 is denoted as the second shaft contact portion (with cover), and a thermal conduction equivalent circuit may be established between the second shaft contact portion and the cover exposed portion 642.

In addition, the housing 650 and the cover 640 are exposed to the exterior air, and thermal convection equivalent circuits may be established between the housing 650 and the exterior air and between the cover 640 and the exterior air according to the ambient temperature.

After the thermal equivalent circuits are established between detail regions of the constituent elements, a temperature of each detail region is calculated. As described above, the temperature of the heat generating portion (i.e., temperatures of the constituent elements of the heat generating portion) is calculated based on the input value 150. After that, the detail regions and the heat generating portion are treated as nodes, and the thermal equivalent circuits between the detail regions and the heat generating portion are established. After that, temperatures of the detail regions are calculated by inputting the temperature of the heat generating portion.

According to the exemplary embodiment of the present disclosure, the calculating portion 130 establishes the thermal conduction circuits or the thermal convection equivalent circuits between constituent elements of the motor 112 and calculates the temperatures of the constituent elements based on the input value 150 in real time.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A system of calculating temperature, comprising:
a motor including a housing having opened ends, a cover connected to the housing to close at least one of the opened ends of the housing, a shaft rotatably disposed in the housing and having one end which penetrates through a center portion of the cover, a rotor fixed on an exterior circumference of the shaft in the housing and the cover, a stator fixed on an interior circumference of the housing, and an air gap formed between an exterior circumference of the rotor and an interior circumference of the stator;
an input portion receiving a real time input and a predetermined input; and
a control portion establishing a thermal equivalent circuit using the real time input and the predetermined input of the input portion and convection or conduction characteristics between constituent elements of the motor, and calculating a temperature of each constituent element using the thermal equivalent circuit, wherein the control portion establishes the thermal equivalent circuit including convection or conduction characteristics between any two of the housing, the cover, the shaft, the rotor, the stator, the air gap between the rotor and the stator, an interior air existing in the housing, and an exterior air existing at an outer of the cover and the housing, and calculates the temperature of each constituent element of the motor based on a heat generation amount generated according to a driving condition of the motor driving condition.

2. The system of claim 1, wherein the shaft comprises:
a first shaft contact portion contacting the rotor;
a first shaft exposed portion exposed to the interior air existing in the cover;
a second shaft contact portion contacting the cover; and
a second shaft exposed portion exposed to the exterior air, and
wherein the control portion establishes a thermal conduction equivalent circuit between the first shaft contact portion and the rotor, establishes a thermal convection equivalent circuit between the first shaft exposed portion and the interior air, establishes a thermal conduction equivalent circuit between the second shaft contact portion and the cover, and establishes a thermal convection equivalent circuit between the second shaft exposed portion and the exterior air.

3. The system of claim 1, wherein the control portion establishes a thermal convection equivalent circuit between the exterior circumference of the rotor and the air gap, establishes a thermal convection equivalent circuit between a side surface of the rotor and the interior air, establishes a thermal convection equivalent circuit between the interior circumference of the stator and the air gap, and establishes a thermal convection equivalent circuit between a side surface of the stator and the interior air.

4. The system of claim 1, wherein the housing comprises:
a housing exposed portion exposed to the interior air; and
a housing contact portion with stator contacting the exterior circumference of the stator, and
wherein the control portion establishes a thermal convection equivalent circuit between the housing exposed portion and the interior air, and establishes a thermal conduction equivalent circuit between the housing contact portion with stator and the exterior circumference of the stator.

5. The system of claim 1, wherein the cover comprises:
a first cover contact portion contacting an end portion of the housing;
a cover exposed portion exposed to the interior air; and
a second cover contact portion contacting the shaft, and
wherein the control portion establishes a thermal conduction equivalent circuit between the first cover contact portion and the housing, establishes a thermal convection equivalent circuit between the cover exposed portion and the interior air, and establishes a thermal conduction equivalent circuit between the second cover contact portion and the shaft.

6. The system of claim 1, wherein the motor further comprises a bearing disposed between the cover and the shaft, and
wherein the control portion establishes a thermal conduction equivalent circuit between the bearing and the cover, and establishes a thermal conduction equivalent circuit between the bearing and the shaft.

7. The system of claim 1, wherein the real time input includes an input power, a torque, an ambient temperature, and a rotation speed as the driving condition, and the predetermined input includes shape, material, physical characteristics, and convection or conduction characteristics of each constituent element of the motor.

8. The system of claim 7, wherein the control portion calculates a temperature of a heat generating portion using the input power and a predetermined efficiency of the motor, and calculates the temperature of each constituent elements using the temperature of the heat generating portion and the thermal equivalent circuit between any two constituent elements.

9. The system of claim 8, wherein the heat generating portion includes a coil of the stator, a core of the stator, a core of the rotor, a bearing, a friction element, and a magnet of the rotor.

10. The system of claim 7, wherein the control portion compares the calculated temperature of each constituent element with a predetermined value for each constituent elements, and lowers the input power or generates a warning signal if the temperature of any one constituent element is higher than the predetermined value for the one constituent element.

* * * * *